United States Patent [19]
Ohnishi et al.

[11] Patent Number: 6,067,137
[45] Date of Patent: *May 23, 2000

[54] IMAGE DISPLAY APPARATUS WITH HYDROPHOBIC DIFFRACTION GRATING FOR AN ENLARGED VIEWING ANGLE

[75] Inventors: Ikuo Ohnishi; Katsuya Fujisawa; Rikuji Watanabe; Katsuhiko Hayashi, all of Kurashiki, Japan

[73] Assignee: Kuraray Co., Ltd., Kurashiki, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/696,793

[22] Filed: Aug. 14, 1996

[30] Foreign Application Priority Data

Aug. 25, 1995 [JP] Japan ................................ 7-216992

[51] Int. Cl.⁷ ............................. G02F 1/1335; G02B 5/18
[52] U.S. Cl. ......................... 349/112; 349/122; 359/507; 359/599
[58] Field of Search ..................................... 349/105, 112, 349/122; 359/599, 507, 512, 513

[56] References Cited

U.S. PATENT DOCUMENTS

| | | |
|---|---|---|
| 3,809,457 | 5/1974 | Kurtz et al. .............................. 359/455 |
| 4,184,746 | 1/1980 | Coale . |
| 4,984,872 | 1/1991 | Vick ......................................... 313/483 |
| 5,365,354 | 11/1994 | Jannson et al. ........................... 359/15 |
| 5,467,224 | 11/1995 | Ohnishi et al. . |
| 5,513,025 | 4/1996 | Watanabe et al. . |
| 5,594,830 | 1/1997 | Winston et al. ......................... 349/146 |
| 5,629,784 | 5/1997 | Abileah et al. .......................... 349/112 |

FOREIGN PATENT DOCUMENTS

| | | |
|---|---|---|
| 5-134252 | 5/1993 | Japan .................................... 349/112 |
| 7-114015 | 5/1995 | Japan . |
| 7-218901 | 8/1995 | Japan . |

OTHER PUBLICATIONS

Translation of Tabata, Japanese patent Hei 7–114015.

*Primary Examiner*—Kenneth Parker
*Attorney, Agent, or Firm*—Oblon, Spivak, McClelland, Maier & Neustadt, P.C.

[57] ABSTRACT

An image display apparatus including an image display device in which pixels are arranged in a dot-like form and a diffraction grating having a lattice face with a water contact angle of 70° or more. The diffraction grating is arranged on a display optical path of the image display device such that the lattice face of the diffraction grating faces toward a side of a viewer and a viewing angle of the image display device is enlarged by the diffraction grating.

13 Claims, 3 Drawing Sheets

IMAGE DISPLAY APPARATUS WITH HYDROPHOBIC DIFFRACTION GRATING FOR AN ENLARGED VIEWING ANGLE

BACKGROUND OF THE INVENTION

1. Field of the Invention

The present invention relates to an image display apparatus using an image display device represented by liquid crystal panels.

2. Description of Related Art

An image display apparatus using an image display device in which pixels are arranged in a dot-like form and which is represented by a light emitting diode array, a liquid crystal panel of a TFT (thin film transistor) active matrix type etc., has been developed. According to such an image display apparatus the contrast of an image displayed on the image display apparatus is significantly changed by the magnitude of an angle made by a direction for viewing the image display apparatus and a direction orthogonal to a display face of the image display apparatus (that is, an angle whereby a direction in which a viewer is disposed, in view from the display face of the image display apparatus, is deviated from a direction orthogonal to a frontal face of the image display apparatus) and fair image quality can be provided only when the viewer views the image display apparatus right in front thereof or substantially right in front thereof. That is, a viewing angle providing fair image quality is narrow in such an image display apparatus. Accordingly, it is difficult for a number of persons to view one display face of the image display apparatus at the same time. Further, when a large screen of the image display apparatus is viewed in close proximity, there is recognized the difference of contrast between the central portion and the peripheral portion of the display face whereby the image quality is deteriorated.

The above-mentioned problem is particularly significant in an image display apparatus using a liquid crystal panel as an image display device. In order to resolve such a problem a liquid crystal display apparatus (refer to Japanese Unexamined Patent Publication No. 65175/1981) in which a polyhedron lens is arranged on the viewer's side of a liquid crystal panel, a display apparatus (refer to Japanese Unexamined Patent Publication No. 25399/1978) in which a concave lens array is arranged, and the like have been developed. However, sufficient image quality has not been achieved in these conventional image display devices although the viewing angles can be enlarged.

SUMMARY OF THE INVENTION

To resolve the above-mentioned problem, it is an object of the present invention to provide an image display apparatus capable of enlarging the viewing angle without deteriorating the image quality.

According to a first aspect of the present invention resolving the above-mentioned problem, an image display apparatus includes an image display device in which pixels are arranged in a dot-like form and a diffraction grating having a lattice face, wherein the diffraction grating is arranged on a display optical path of the image display device such that the lattice face of the diffraction grating faces toward a side of a viewer and the viewing angle of the image display device is enlarged by the diffraction grating. Further, according to a second aspect of the present invention resolving the above-mentioned problem, an image display apparatus includes an image display device having a display face on which a diffraction grating having a lattice face is provided such that the lattice face thereof faces toward a side of a viewer, wherein the viewing angle of the image display device is enlarged by the diffraction grating.

According to the image display apparatus in accordance with the first or the second aspect of the present invention, it is preferable for obtaining higher image quality to satisfy the following equation (1)

$$L/12 < T \cdot D \cdot (n-1)/P < 4 \cdot L \qquad (1)$$

where T is given by the following equation (2), $$T = \sum_{i=1}^{M} ti/ni, \qquad (2)$$

where the period of lattice of the diffraction grating comprising a base portion and a lattice portion is represented by P, the period of the pixels of the image display device is represented by L, a stepwise difference between a recessed portion and a projected portion at the lattice portion of the diffraction grating is represented by D, the index of diffraction of the lattice portion of the diffraction grating is represented by n, a number of layers of from faces of the pixels of the image display device on the viewer's side to the base portion of the diffraction grating is represented by M, the index of diffraction of each of the layers of the faces of the pixels of the image display device on the viewer's side to the base portion of the diffraction grating is represented by ni and a thickness of each of the layers is represented by ti, respectively. Incidentally, the lattice portion of the diffraction grating is referred to as a portion from apexes of the projected portions of the lattice to the bottoms of the recessed portions thereof and the base portion of the diffraction grating is referred to as a portion from the bottoms of the recessed portions of the lattice to a side of a plane face (the face on the side where the lattice is not formed) of the diffraction grating. Also, with regard to the number of layers of from the faces of the pixels of the image display device on the viewer's side to the base portion of the diffraction grating, in the case of, for example, an image display apparatus in which a liquid crystal panel as an image display device is provided with the structure where pixels are interposed between glass protective plates and a polarizing plate in which a polyvinyl alcohol (vinilon) film is sandwiched by triacetyl cellulose (TAC) films, is combined with the above-mentioned liquid crystal panel, it designates a number of layers having different indexes of refraction such as the protective plate on the viewer's side, the TAC film, the polyvinyl alcohol film, an adhesive layer having the TAC film adhere to the poly(vinyl alcohol) film, an air layer etc. (That is, when a plurality of materials having substantially the same index of refraction are laminated, the plurality of materials are counted as a single layer). However, when a thickness of the adhesive layer or the air layer is extremely small, these layers are negligible in calculation.

According to the present invention, light emitted from the pixels of the image display device is diffracted, bent and diffused by the diffraction grating provided on the display optical path of the image display device or at the display face of the image display device and therefore, the extent of emitting light is expanded. In this way the viewing angle of the image display apparatus is enlarged.

There are CRT, light emitting diode, liquid crystal panel etc. as the image display devices that are used in the present invention. As systems of a liquid crystal panel, there are the simple matrix drive system, the active matrix drive system etc. and as modes of liquid crystal, there are twist nematic type, super twist nematic type etc. as representative ones.

The diffraction grating according to the present invention is manufactured by, for example, the following process. A transparent film or a transparent plate made of polycarbonate, acrylic resin, TAC etc. is mounted at a mold (or stamper) on which a recess and projection pattern corresponding to the lattice of the diffraction grating is provided, the transparent film etc. is thermally deformed in the mold (or on the stamper), the thermally deformed transparent film etc. is cooled and thereafter, the mold or the stamper is removed. The diffraction grating according to the present invention is manufactured also by the following process. An ultraviolet ray setting transparent resin is coated on a transparent film or a transparent plate and an ultraviolet ray is irradiated on the transparent film or the transparent plate while a mold (or a stamper) on which a recess and projection pattern corresponding to the lattice of the diffraction grating is provided, is being mounted on a face thereof coated with the ultraviolet ray setting transparent resin whereby the transparent resin is cured. A thermosetting transparent resin may be coated thereon in place of the ultraviolet ray setting transparent resin and the transparent resin may be thermally cured. Further, the diffraction grating according to the present invention can also be manufactured by coating an ultraviolet ray setting transparent resin on a transparent film or a transparent plate, irradiating an ultraviolet ray on the transparent resin through a photomask on which a recess and projection pattern corresponding to the lattice of the diffraction grating is printed and thereafter, developing the ultraviolet ray setting transparent resin. Furthermore, the diffraction grating according to the present invention can be manufactured by performing an injection molding by using a thermoplastic transparent resin made of polycarbonate, acrylic resin etc.

The side of a plane face (face on the side where the lattice is not formed) of the diffraction grating in the present invention is disposed on the side of the pixels of the image display device and this face can be pasted together with a protective plate of the image display device. Thereby, an air layer between the image display device and the diffraction grating is dispensed with, reflection of light caused at an interface between the image display device and air and at an interface between the diffraction grating and air can be suppressed and a ratio of light emitted from the image display device to the outside via the diffraction grating can be increased. Also, a similar effect can be provided by forming the diffraction grating directly on the protective plate of the liquid crystal panel or the polarizing plate of the liquid crystal panel.

Although high brightness is generally required in an image display apparatus, when the diffraction grating is installed in front of the image display device (the display optical path of the image display device or the display face of the image display device), the brightness of the image display apparatus may be lowered due to an increase in a number of faces reflecting light from the image display device such as the interface between the diffraction grating and air. This problem can be resolved by pasting together the diffraction grating and the protective plate etc. When a further higher brightness is necessary, an antireflection film may be coated on the viewer's side (face having the lattice) of the diffraction grating. Incidentally, it is preferable for obtaining the high brightness that the light ray transmittance of the diffraction grating is 97% or more in a wavelength range of 450 through 650 nm.

It is more preferable for obtaining the high contrast to use a diffraction grating having a sectional shape in a continuous curve than in the case where a diffraction grating having a discontinuous sectional shape (for example, rectangular shape) is used. It is preferable that the period of the diffraction grating is smaller than the period of the pixels of the image display device since the pattern of lattice in the diffraction grating is not observed. It is preferable that the depth of lattice (a stepwise difference between a recessed portion and a projected portion) of the diffraction grating is 1 μm or more since the diffraction efficiency of the diffraction grating is improved.

Image quality of a small-sized television receiver etc. is deteriorated during its use due to contamination of a screen. This problem can be solved by coating a contamination preventive coating on the lattice face of the diffraction grating by using a fluorine group resin etc. An excellent contamination preventive function can be provided by rendering the angle of contact of water at the surface of the diffraction grating 70° or more by performing the contamination preventive coating.

The image quality is deteriorated also by making a flaw on the screen while using thereof. It is preferable that a hard coating agent is coated on the lattice face (viewer's side) of the diffraction grating and the pencil hardness of this face is enhanced to H or higher.

Incidentally, when a flourescent lamp etc. is reflected by the screen, the contrast is deteriorated and also the recognizability is deteriorated since the reflected image overlaps the original image in the screen. This problem can be resolved by subjecting the recess and projection face of the diffraction grating to a nonglaring treatment without deteriorating the image.

DETAILED DESCRIPTION OF THE REFERRED EMBODIMENTS

Figure 1:
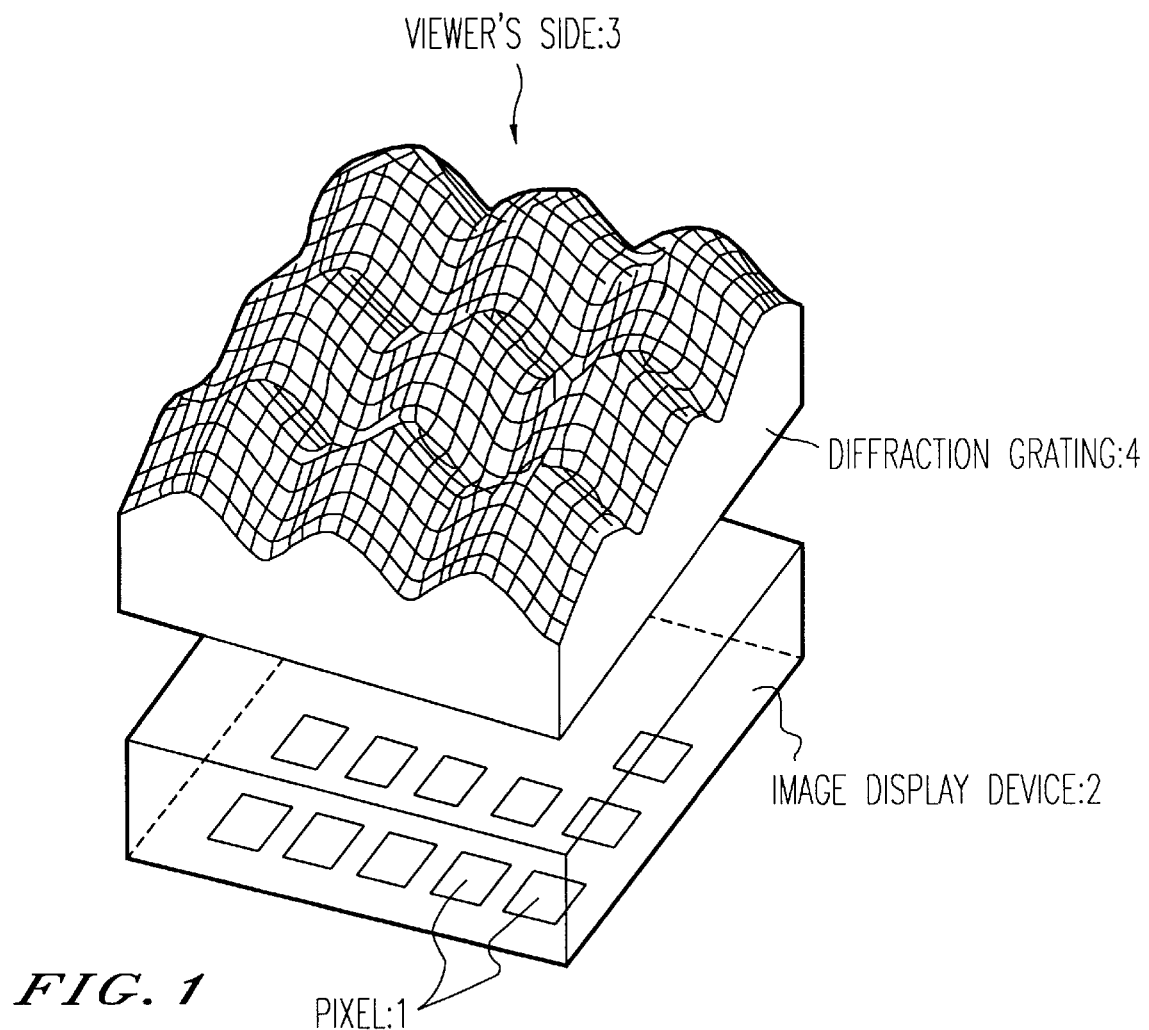
FIG. 1 is an outline structural view showing a first embodiment of an image display apparatus according to the present invention.

FIG. 1 illustrates the outline structure of a first embodiment of an image display apparatus according to the present invention. The image display apparatus is provided with an image display device 2 in which pixels 1 are arranged in a dot-like form and a diffraction grating 4 having a lattice face. The diffraction grating 4 is arranged on a display optical path of the image display device 2 such that the lattice face of the diffraction grating 4 faces toward a viewer's side 3. The pixels 1 of the image display device control light emitted by the pixels per se, light incident on the pixels from a light source provided on the side opposed to the viewer's side or light incident on the pixels from a light source provided on the viewer's side and the image display device 2 displays an image by controlling the pixels. The diffraction grating in the image display apparatus as illustrated in FIG. 1 is provided with a sectional shape in a continuous curve and the sectional shape is substantially in a form of a sine wave as shown by FIG. 1.

By arranging the diffraction grating on the display optical path of the image display device as in the above-mentioned image display apparatus, light emitted from the pixels of the image display device is diffracted, bent and diffused by the diffraction grating provided on the display optical path of the image display device or on the display face of the image display device and the viewing angle of the image display apparatus is enlarged. However, on the other hand deterioration of image quality due to whitening of image may be caused. The degree of the deterioration of image quality is varied depending on the position for installing the diffraction grating, the period of the diffraction grating, the depth of lattice of the diffraction grating etc. Now, assume the case where the diffraction grating is arranged on the viewer's side of a liquid crystal panel, as an example. A portion of the apparatus from the pixels of the liquid crystal panel to the diffraction grating is in a multi-layered structure of a glass substrate protecting the pixels of the liquid crystal panel, a TAC film of a polarizing plate, a poly(vinyl alcohol)film of the polarizing plate, an adhesive layer adhering the TAC film to the poly(vinyl alcohol) film, an air layer etc. and thicknesses and the indexes of refraction of these respective layers pose a significant influence on the image quality. Hence, the image was evaluated by using samples of various diffraction gratings prepared by varying the depth of lattice and the period of the diffraction grating.

Figure 2:
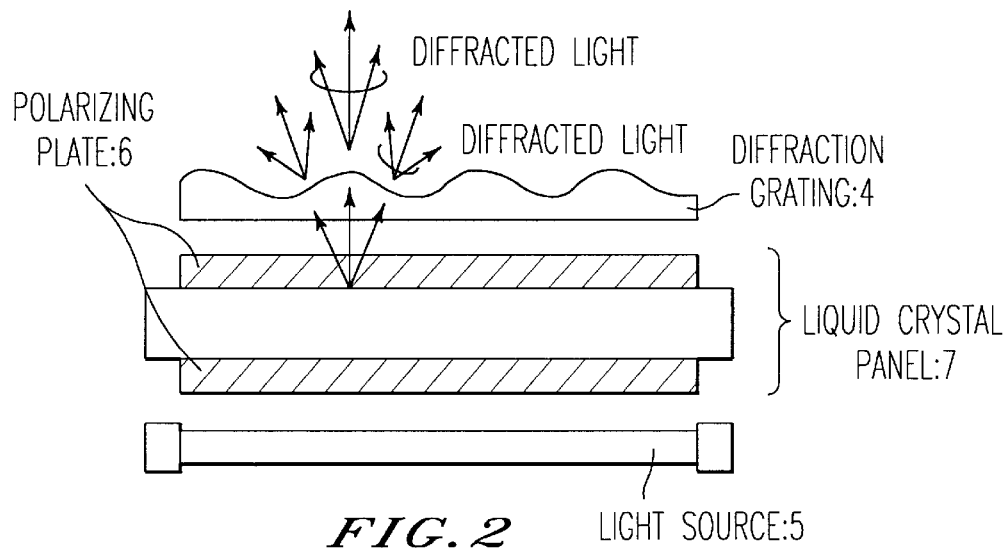
FIG. 2 is an outline structural view showing an image display apparatus used for evaluation.

Now, the outline structure of the image display apparatus that was used for the evaluation is shown in FIG. 2. In this image display apparatus light emitted from a light source 5 is incident on a liquid crystal panel 7 of a TFT (thin film transistor) type in which polarizing plates 6 each sandwiching the poly(vinyl alcohol) film by the TAC films, are arranged on the top and the bottom faces thereof, where a control is performed to allow light to transmit through or block light by the pixels of the liquid crystal panel 7 whereby the image is displayed. A diffraction grating 4 is arranged on the viewer's side 3 which is opposed to the side of the light source 5 and light transmitted through the pixels is diffracted and the viewing angle is enlarged by the diffraction grating as shown by FIG. 2. In this image display apparatus five layers of a glass substrate (which is one of constituent elements of the liquid crystal panel, not illustrated), the TAC film, the poly(vinyl alcohol)film, the TAC film and the air layer, are arranged from the faces of the pixels of the image display device on the viewer's side to the base portion of the diffraction grating. The diffraction gratings were prepared by varying the period of lattice of the diffraction grating to 50 μm or 100 μm. The diffraction gratings were prepared by varying the stepwise difference between the recessed portion and the projected portion (namely, the thickness of the lattice portion of the diffraction grating) in the recess and projection of the diffraction grating in a range of 1.4 through 294 μm. Further, the index of refraction at the portion of the diffraction grating was determined to be 1.53. The result of evaluation of image quality is shown in Table 1. Incidentally, the thickness of each of the adhesive layers respectively adhering the TAC film to the poly(vinyl alcohol) film was extremely small and therefore, it was neglected in calculation.

TABLE 1

| Value of α | Result of evaluation of image quality | Result of evaluation of viewing angle enlargement |
|---|---|---|
| 0.05 | ○ | x |
| 0.1 | ○ | Δ |

TABLE 1-continued

| Value of α | Result of evaluation of image quality | Result of evaluation of viewing angle enlargement |
|---|---|---|
| 0.2 | ○ | Δ |
| 0.5 | ○ | ○ |
| 1.0 | ○ | ○ |
| 2.0 | ○ | ○ |
| 2.5 | Δ | ○ |
| 3.0 | Δ | ○ |
| 3.5 | Δ | ○ |
| 4.0 | Δ | ○ |
| 4.5 | x | ○ |

α in Table is a value given by the following equation.

$$\alpha = T \cdot D \cdot (n-1)/(P-L)$$

With regard to the result of evaluation of image quality, ○ indicates no deterioration of image quality, Δ indicates inconsiderable deterioration of image quality and x indicates considerable deterioration of image quality, respectively. With regard to the result of evaluation of viewing angle enlargement, ○ indicates significant viewing angle enlarging feature, Δ indicates insignificant viewing angle enlarging feature and x indicates no viewing angle enlarging feature, respectively.

It was found from these results that the viewing angle was enlarged while high image quality was being maintained when the following Equation (1) was satisfied.

$$L/12 < T \cdot D \cdot (n-1)/P < 4 \cdot L \tag{1}$$

where T in Equation (1) is given by the following Equation (2):

$$T = \sum_{i=1}^{M} t_i / n_i \tag{2}$$

Figure 3:
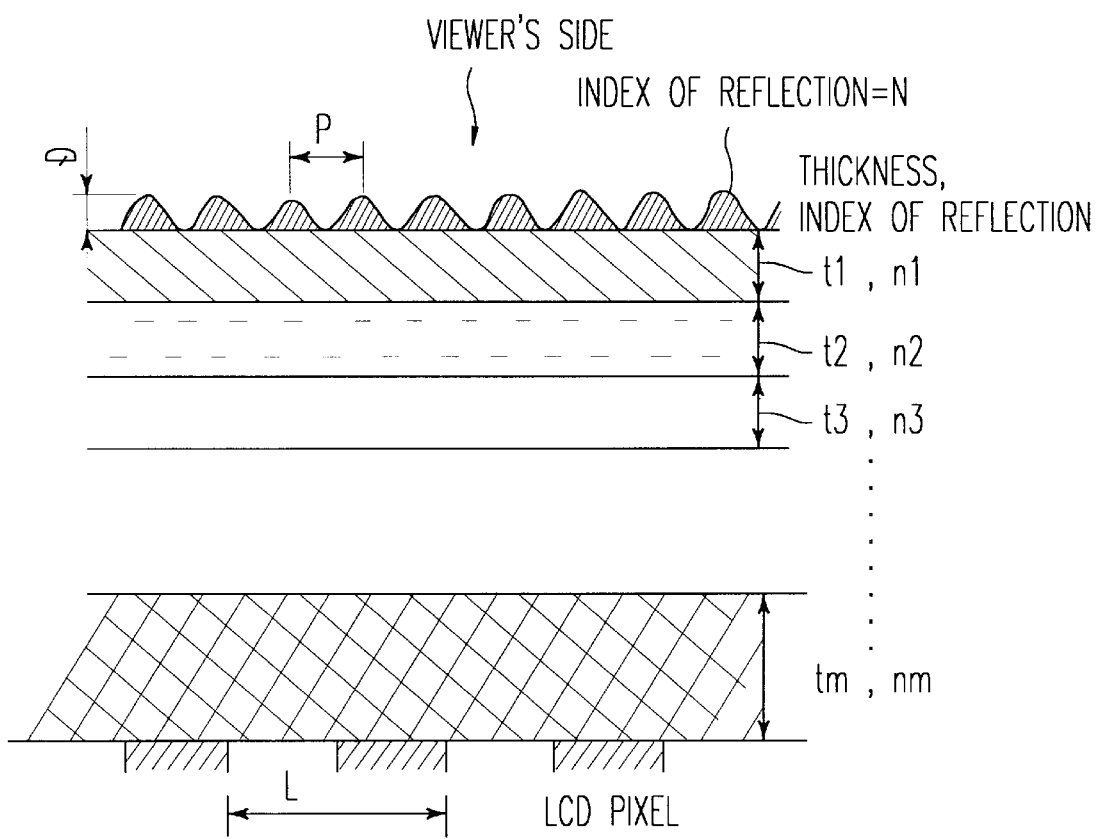
FIG. 3 is a view schematically showing a section of a first embodiment of the image display apparatus according to the present invention.

In Equations (1) and (2), as shown in FIG. 3, the period of lattice of the diffraction grating is represented by P, the period of the pixels of the image display device is represented by L, the stepwise difference between the recessed portion and the projected portion in the lattice portion of the diffraction grating is represented by D, the index of the refraction of the lattice portion of the diffraction grating is represented by n, a number of layers of from faces of the pixels of the image display device on the viewer's side to the base portion of the diffraction grating is represented by M, the index of refraction of each of the layers of from the faces of the pixels of the image display device on the viewer's side to the base portion of the diffraction grating is represented by ni and a thickness of each of the layers is represented by ti, respectively. Further, the index of refraction of air is determined to be 1.

According to the present invention, it is preferable in view of providing higher image quality to satisfy the following Equation (3) in place of Equation (1).

$$L/10 < T \cdot D \cdot (n-1)/P < 3 \cdot L \tag{3}$$

Further higher image quality can be provided by using a diffraction grating satisfying the following Equation (4).

$$L/8 < T \cdot D \cdot (n-1)/P < 2 \cdot L \tag{4}$$

Figure 4:
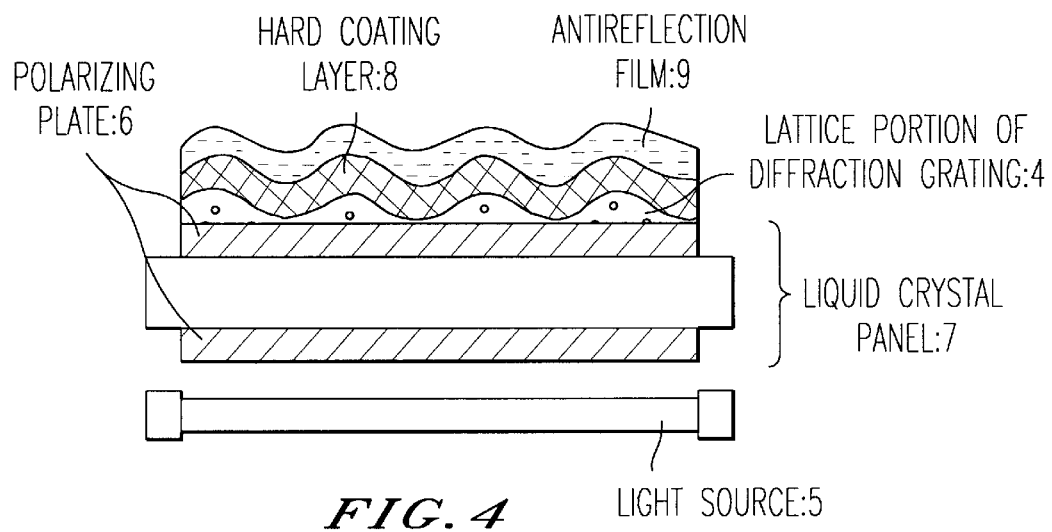
FIG. 4 is an outline structural view showing a second embodiment of an image display apparatus according to the present invention.

FIG. 4 shows the outline structure of a second embodiment of an image display apparatus according to the present invention. According to the image display apparatus a liquid crystal panel 7 of a TFT type is used as an image display device and a lattice portion 4 of a diffraction grating is provided directly on a polarizing plate 6 that is disposed on the side opposed the side of a light source 5. The poly(vinyl alcohol)film is sandwiched by the TAC films in the polarizing plate 6. That is, the TAC film on the viewer's side of the polarizing plate corresponds to the base portion of the diffraction grating. A hard coating layer 8 and an antireflection film 9 are installed from the side of the lattice portion 4 of the diffraction grating, on the viewer's side of the diffraction grating. According to this embodiment of the image display apparatus an apparatus in which the brightness of displayed image is high and the displayed image is difficult to be flawed, is provided. In this image display apparatus there are arranged four layers of a glass substrate, (which is one of constituent elements of the liquid crystal panel, not illustrated), the TAC film, the poly(vinyl alcohol) film and the TAC film (the base portion of the diffraction grating) from the faces of the pixels of the image display device on the viewer's side to the base portion of the diffraction grating if the adhesive layers adhering the TAC films to the poly(vinyl alcohol)film, are neglected in calculation.

According to the image display device of the present invention the viewing angle is enlarged and excellent image with insignificant deterioration of image quality is obtained.

What is claimed is:

1. An image display apparatus comprising:
    an image display device in which pixels are arranged;
    a diffraction grating having a lattice face;
    wherein the angle of contact of water at the lattice face in the diffraction grating is 70° or more;
    wherein the diffraction grating is arranged on a display optical path of the image display device such that the lattice face of the diffraction grating faces toward a side of a viewer and a viewing angle of the image display device is enlarged by the diffraction grating;
    wherein the diffraction grating satisfies the following Equation (1):

$$L/12 < T \cdot D \cdot (n-1)/P < 4 \cdot L \tag{1}$$

where T is given by the following Equation (2):

$$T = \sum_{i=1}^{M} ti/ni \tag{2}$$

where a period of a lattice of the diffraction grating comprising a base portion and a lattice portion is represented by P, a period of the pixels of the image display device is represented by L, a stepwise difference between a recessed portion and a projected portion in the lattice portion of the diffraction grating is represented by D, an index of diffraction of the lattice portion of the diffracting grating is represented by n, a number of layers of from faces of the pixels of the image display device on the viewer's side to the base portion of the diffraction grating is represented by M, an index of diffraction of each of the layers of the faces of the pixels of the image display device on the viewer's side to the base portion of the diffraction grating is represented by ni, and a thickness of each of the layers is represented by ti, respectively.

2. The image display apparatus according to claim 1, wherein the image display device is a liquid crystal panel.

3. The image display apparatus according to claim 1, wherein the diffraction grating has grating elements extending in first and second directions, said grating elements extending in said first direction having a substantially uniform grating height and said grating elements extending in said second direction having a substantially uniform grating height.

4. An image display apparatus including an image display device having a display face on which a diffraction grating having a lattice face is provided such that the lattice face of the diffraction grating faces toward a side of a viewer, wherein a viewing angle of the image display device is enlarged by the diffraction grating;
    wherein the angle of contact of water at the lattice face in the diffraction grating is 70° or more; and
    wherein the diffraction grating satisfies the following Equation (1):

$$L/12 < T \cdot D \cdot (n-1)/P < 4 \cdot L \tag{1}$$

where T is given by the following Equation (2):

$$T = \sum_{i=1}^{M} ti/ni \tag{2}$$

where a period of a lattice of the diffraction grating comprising a base portion and a lattice portion is represented by P, a period of the pixels of the image display device is represented by L, a stepwise difference between a recessed portion and a projected portion in the lattice portion of the diffraction grating is represented by D, an index of diffraction of the lattice portion of the diffracting grating is represented by n, a number of layers of from faces of the pixels of the image display device on the viewer's side to the base portion of the diffraction grating is represented by M, an index of diffraction of each of the layers of the faces of the pixels of the image display device on the viewer's side to the base portion of the diffraction grating is represented by ni, and a thickness of each of the layers is represented by ti, respectively.

5. The image display apparatus according to any one of claim 1 through claim 4, wherein the image display device is a liquid crystal panel.

6. The image display apparatus according to claim 5, wherein the liquid crystal panel includes a protective plate and the diffraction grating is formed on the protective plate.

7. The image display apparatus according to claim 5, wherein the liquid crystal panel includes a polarizing plate and the diffraction grating is formed on the polarizing plate.

8. The image display apparatus according to any one of claim 1 through claim 4, wherein a light ray transmittance of the diffraction grating in a range of a wavelength of 450 through 650 nm is 97% or more.

9. The image display apparatus according to any one of claim 1 through claim 4, wherein the diffraction grating is provided with a sectional shape in a continuous curve.

10. The image display apparatus according to any one of claim 1 through claim 4, wherein the period of the lattice of the diffraction grating is smaller than the period of the pixels of the image display device.

11. The image display apparatus according to any one of claim 1 through claim 4, wherein the stepwise difference between the recessed portion and the projected portion of the lattice in the diffraction grating is 1 μm or more.

12. The image display apparatus according to any one of claim 1 through claim 4, wherein the pencil hardness of the lattice face in the diffraction grating is H or higher.

13. The image display apparatus according to claim 4, wherein the diffraction grating has grating elements extending in first and second directions, said grating elements extending in said first direction having a substantially uniform grating height and said grating elements extending in said second direction having a substantially uniform grating height.

* * * * *